July 1, 1969     M. L. LOVE     3,452,885
REMOTELY CONTROLLED COMBINE UNLOADING AUGER
Filed Oct. 16, 1967
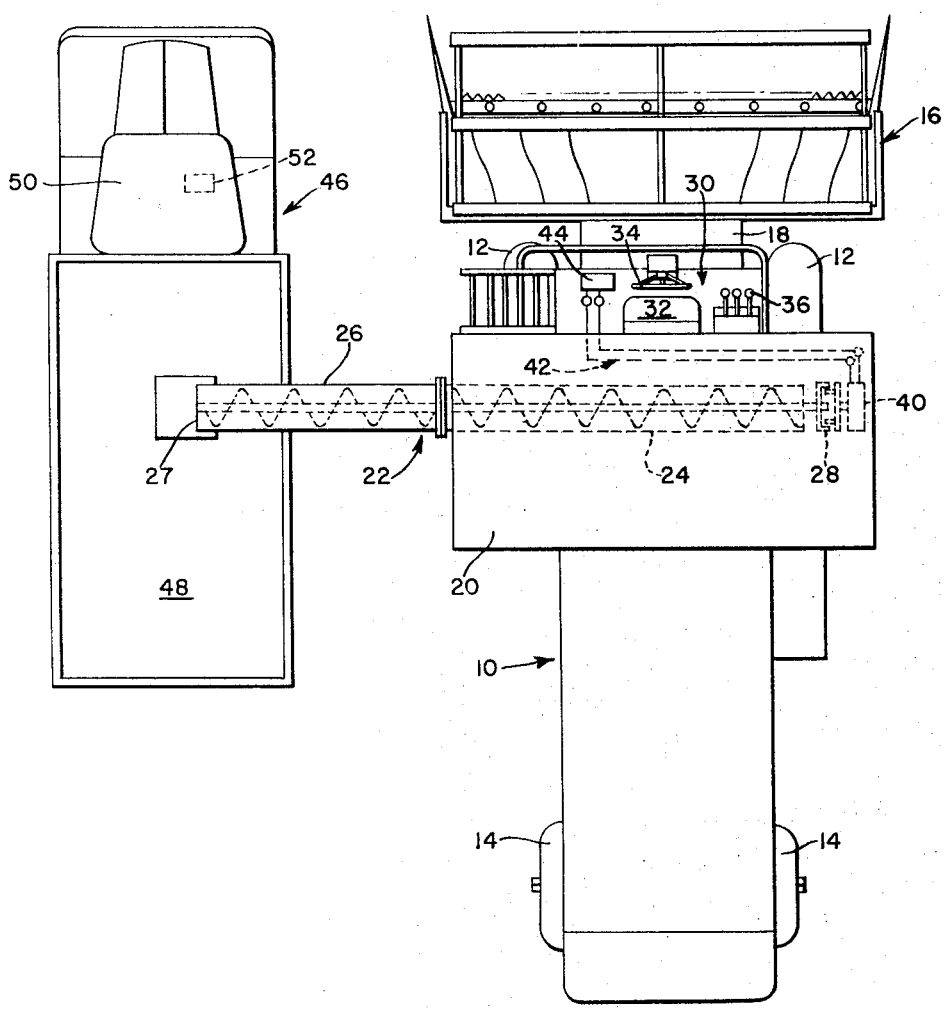

United States Patent Office 3,452,885
Patented July 1, 1969

3,452,885
REMOTELY CONTROLLED COMBINE UNLOADING AUGER
Mahlon Lloyd Love, Zweibrucken, Germany, assignor to Deere & Company, Moline, Ill., a corporation of Delaware
Filed Oct. 16, 1967, Ser. No. 675,447
Claims priority, application Germany, Oct. 21, 1966, D 51,380
Int. Cl. A01d 43/00
U.S. Cl. 214—38                                    3 Claims

ABSTRACT OF THE DISCLOSURE

A self-propelled combine having a grain tank with a transverse unloading auger extending laterally from the combine and drivable through an electrically actuated clutch controlled by a radio receiver operated switch, the receiver in turn being responsive to a radio signal selectively sent from a transmitter in a crop transport vehicle so that the vehicle operator is able to selectively control the unloading auger from the vehicle.

Background of the invention

This invention relates to a combine unloading auger and controls therefor.

A typical combine includes a grain tank for the temporary storage of the harvested crop, the crop being unloaded from the grain tank at intervals through an auger-type discharge conveyor into a crop transport vehicle, such as a truck- or a tractor-pulled wagon, which then transports the crop from the field to the crop storage facilities.

Conventionally, the unloading auger is driven by the combine power source through a drive system, which includes some variety of clutching mechanism engageable to drive the auger, the clutching mechanism being selectively controlled by the combine operator. In the case of a self-propelled combine, the clutching mechanism has been controlled through controls located at the operator's station on the combine, while in pull-type combines, controls have been provided so that the clutching mechanism could be engaged by the tractor operator from the tractor.

In such a system, it has been necessary that the combine operator observe the filling of the transport vehicle so that the unloading auger could be disengaged at the proper time. Generally, the direction of the attention of the operator to the unloading function has necessitated an interruption of the harvesting operation while the grain tank is unloaded, since the operation of the machine during the harvesting operation generally requires the full attention of the operator. Thus, the unloading of the grain tank has resulted in intermittent delays in the harvesting operation.

Summary of the invention

According to the present invention, means are provided for controlling the unloading auger from the transport vehicle which receives the crop from the auger, so that the unloading function requires only the attention of the operator of the transport vehicle and does not interrupt the harvesting function of the combine. More specifically, the crop-receiving vehicle or vehicles are provided with a radio transmitter capable of selectively producing a signal, which actuates the combine unloading auger through a receiver-operated switching device on the combine.

Brief description of the drawing

The sole figure in the drawings is a somewhat schematic plan view of a self-propelled combine and an associated crop-receiving vehicle embodying the invention.

Description of the preferred embodiment

The invention is embodied in a typical self-propelled combine having a main combine body, indicated generally by the numeral 10, mounted on a pair of forward drive wheels 12 and a pair of steerable rear wheels 14. The main body 10 typically carries a forwardly disposed, transversely elongated grain harvesting header 16, which removes the crop from the fields, converges it, and delivers it rearwardly through a feeder housing 18 to a separating mechanism (not shown) in the main combine body. The separated crops is conventionally cleaned and elevated to a grain tank 20 mounted on the combine body 10, where the crop is temporarily stored.

The grain is unloaded from the grain tank at intervals by an unloading auger 22, which includes an inner portion 24 in the bottom of the grain tank and an outer portion 26, which is conventionally shiftable between a folded back, transport position and a laterally extending position, as shown in the drawing, wherein it is fed by the inner portion 24 and moves the grain through its discharge end 27, which is laterally spaced a substantial distance from the side of the main combine body 10. The unloading auger is conventionally drivable by the combine power source through a drive system, which includes a coupling or a clutch 28 engageable to drive the unloading auger. Any type of disengageable coupling or clutch could be utilized, and the coupling or clutch could be located at any location between the power source and the auger, the clutch being schematically illustrated at the intake end of the auger in the illustrated embodiment. The drive train between the power source and the clutch is not illustrated, such drives being well known. Conventionally, belt- or chain-type drives are utilized, and the coupling or clutch could be in the form of a shiftable mechanism associated with the belt or chain drive for establishing a driving connection therein.

An operator's station, indicated generally by the numeral 30, is disposed forwardly on the combine body, immediately in front of the grain tank 20, and includes a seat 32, a steering wheel 34, and various control levers 36 through which the operator controls various functions of the combine.

In the illustrated embodiment, the clutch 28 is engaged by an electric clutch actuator, represented by the functional box 40, such clutch actuators being well known. The clutch actuator 40 is included in an electric circuit 42, which also includes a source of electric power, preferably the combine battery (not shown), and a radio receiver actuated switch, indicated by the functional box 44. Such receiver actuated switches are also well known and are utilized in many remote control applications. For example, the well-known remotely controlled garage doors generally utilize a switch which completes an electric circuit providing electric power to a motor which operates the doors, the switch being actuated by a radio received responsive to a radio signal transmitted from the approaching automobile. The switch in the combined receiver and switch 44 could be manually controlled by the combine operator from the operator's station 30, so that the combine operator can selectively supply the electric power to the clutch actuator 40 to engage the clutch 28 and drive the unloading auger 22.

The crop is unloaded from the grain tank 20 into an adjacent crop transport vehicle, indicated generally by the numeral 46, having a crop receiving container 48 located under the discharge end 27 of the unloading auger 22 and a forward operator's station 50, the vehicle 46 in the illustrated embodiment being a conventional truck wherein the operator's station is in the form of a truck cab. Of course, the vehicle 46 could be in the form of a tractortowed wagon or the like wherein the operator's station would be located on the tractor.

Located at the operator's station 50 is a radio transmitter, indicated by the functional box 52, which can be selectively actuated by the vehicle operator from the operator's station 50 to emit a predetermined radio signal, which, when received by the combined receiver and switch 44, causes the switch to close, completing the electric circuit 42 to engage the clutch 28 and drive the unloading auger 22.

In operation, as the combine harvests the crop, the crop is temporarily stored in the grain tank 20. At appropriate intervals, the operator of the crop transport vehicle 46 drives his vehicle alongside the combine with the vehicle's crop-receiving container 48 disposed below the discharge end 27 of the unloading auger 22. When the container is so situated, the operator of the transport vehicle actuates the transmitter 52, which emits a radio signal, and the receiver 44 is so tuned that its associated switch closes upon receiving the signal. As previously described, the closing of the switch completes the electric circuit to actuate the clutch actuator 40 to cause engagement of the clutch 28 and the consequent driving of the unloading auger 22. When the container 48 on the transport is filled, or if the transport vehicle operator desires to discontinue the unloading operation, he can shut off the transmitter 52, so that the switch 44 opens, causing the disengagement of the auger drive.

Of course, as many vehicles as desired could be equipped with a transmitter 52, so that the grain tank 20 could be unloaded into any number of vehicles. Also, different combines in the same field could be attuned to different signals and the transmitters 52 could be equipped to produce alterntae signals, so that each transport vehicle could remotely control the unloading of any of the combines.

As is apparent from the above, the entire unloading function can be accomplished without the attention or even the awareness of the combine operator, so that the harvesting function of the combine is not interrupted. However, as previously described, the switch 44 could be manually actuated by the combine opertaor for unloading into vehicles not equipped with the remote controls.

I claim:
1. In a combine having a mobile body, an operator's station, a grain tank mounted on the body for temporary storage of the harvested crop, a discharge conveyor means associated with the grain tank, including a discharge end laterally spaced from the combine body, and drivable to move the crop from the grain tank through the discharge end of the conveyor means, and a drive means actuatable to drive the conveyor means, and a mobile crop transporting vehicle having an operator's station and a crop-receiving container positionable beneath the discharge end of the conveyor for receiving the crop therefrom, the improvement comprising: a signal producing device at the operator's station of the crop-receiving vehicle selectively actuatable to produce a predetermined signal; a receiver means mounted on the combine body and actuatable in response to said predetermined signal; an electric circuit including a switch means operative to complete the circuit and actutatable in response to actuation of the receiver means; and means responsive to current in said circuit for actuating said conveyor drive means.

2. The invention defined in claim 1 wherein the conveyor drive means includes a clutch means engageable in response to current in said circuit to actuate the drive means.

3. The invention defined in claim 1 wherein the switch means is disposed at the combine operator's station and is selectively actuatable by the combine operator independent of the receiver means.

References Cited
UNITED STATES PATENTS 2,541,984  2/1951  Chandler _____ 214—83.32 X
3,173,381  3/1965  Charles et al. _____ 214— 58 X ROBERT G. SHERIDAN, Primary Examiner.

U.S. Cl. X.R.
214—83.32; 198—1